(12) United States Patent
Sawano

(10) Patent No.: US 7,483,157 B2
(45) Date of Patent: Jan. 27, 2009

(54) PRINT CONTROLLER AND PRINTER

(75) Inventor: Tetsuya Sawano, Asaka (JP)

(73) Assignee: Fujifilm Corporation, Tokyo (JP)

( * ) Notice: Subject to any disclaimer, the term of this patent is extended or adjusted under 35 U.S.C. 154(b) by 910 days.

(21) Appl. No.: 11/065,446

(22) Filed: Feb. 25, 2005

(65) Prior Publication Data

US 2005/0195423 A1 Sep. 8, 2005

(30) Foreign Application Priority Data

Mar. 3, 2004 (JP) ............ P.2004-058776

(51) Int. Cl.
*G06K 1/00* (2006.01)
*G06K 15/00* (2006.01)
*G06K 5/00* (2006.01)
*G06K 19/06* (2006.01)

(52) U.S. Cl. ............ 358/1.11; 358/1.12; 358/1.13; 358/1.14; 358/1.15; 358/3.28; 235/380; 235/492

(58) Field of Classification Search .......... 358/1.12, 358/1.13, 1.14, 1.15, 3.28; 235/380, 492
See application file for complete search history.

(56) References Cited

U.S. PATENT DOCUMENTS

| | | | | |
|---|---|---|---|---|
| 5,181,059 A | * | 1/1993 | Mauchan ............ | 396/317 |
| 5,329,449 A | * | 7/1994 | Tanizawa et al. ...... | 701/25 |
| 6,111,277 A | * | 8/2000 | Ikeda ............ | 257/99 |
| 6,209,097 B1 | * | 3/2001 | Nakayama et al. ...... | 713/193 |
| 6,646,764 B1 | | 11/2003 | Wataya | |
| 6,647,764 B1 | * | 11/2003 | Paul et al. ............ | 73/54.41 |
| 2002/0193047 A1 | * | 12/2002 | Weston ............ | 446/484 |
| 2004/0021898 A1 | | 2/2004 | Ashizaki | |
| 2004/0035934 A1 | * | 2/2004 | Miyazawa et al. ...... | 235/454 |

FOREIGN PATENT DOCUMENTS

| | | |
|---|---|---|
| EP | 0 921 675 A2 | 6/1999 |
| EP | 1 085 740 A2 | 3/2001 |
| EP | 1 199 878 A2 | 4/2002 |
| EP | 1 202 548 A1 | 5/2002 |
| EP | 1 376 265 A2 | 1/2004 |
| GB | 2324002 A | 10/1998 |
| JP | 09 194167 A | 7/1997 |
| JP | 2000 037557 A | 2/2000 |

(Continued)

*Primary Examiner*—Mark K Zimmerman
*Assistant Examiner*—Haris Sabah
(74) *Attorney, Agent, or Firm*—Birch, Stewart, Kolasch & Birch, LLP

(57) ABSTRACT

A portable printer contains a print controller that acquires first ID of a first character printed in advance on an instant film from a wireless tag embedded in the instant film; acquires second ID of a second character contained in image data to be printed on the instant film from a header of the image data. The print controller makes a judgment based on a print permission table and the IDs of the first and second characters as to whether an image based on the image data is permitted to be printed together on the instant film. The print controller then performs an output based on a result of the judgment. The print permission table is stored in a storage portion and indicates whether the first character and the second character are allowed to be printed on a common instant film.

14 Claims, 9 Drawing Sheets

| TABLE CODE | FIRST CHARACTER ID | SECOND CHARACTER ID | PRINT PERMISSION |
|---|---|---|---|
| a | A | A | O |
| b | A | B | X |
| c | A | C | X |
| d | B | A | X |
| e | B | B | X |
| f | B | C | O |
| g | C | A | X |
| h | C | B | O |
| I | C | C | X |

FOREIGN PATENT DOCUMENTS

| | | |
|---|---|---|
| JP | 2001-78015 A | 3/2001 |
| JP | 2002-92350 A | 3/2002 |
| JP | 2004-29859 A | 1/2004 |
| TW | 411711 B | 11/2000 |
| TW | 500964 B | 9/2002 |

* cited by examiner

FIG. 6

| TABLE CODE | FIRST CHARACTER ID | SECOND CHARACTER ID | PRINT PERMISSION |
|---|---|---|---|
| a | A | A | O |
| b | A | B | X |
| c | A | C | X |
| d | B | A | X |
| e | B | B | X |
| f | B | C | O |
| g | C | A | X |
| h | C | B | O |
| I | C | C | X |

PRINT CONTROLLER AND PRINTER

The present application claims foreign priority based on Japanese Patent Application No. JP2004-58776, filed Mar. 3 of 2004, the contents of which is incorporated herein by reference. The priority claim for this application is being made concurrently with the filing of this application.

BACKGROUND OF THE INVENTION

1. Technical Field

The present invention relates to a print controller for controlling printing of an image on a printing medium.

2. Background Art

A portable printer for printing an image on an instant film on the basis of image data sent from a camera-including portable phone has been heretofore known in the related art (e.g. see JP-A-2002-92350). Besides an instant film of the type having no character on its outer frame except an image print portion, an instant film of the type having characters 2 printed on its outer frame in advance is on the market as represented by an instant film 1 shown in FIG. 9A.

According to a system described in JP-A-2002-92350, an original image can be synthesized from an image captured by a portable phone and a frame image 4 (hereinafter also referred to as "contents") including a character 3 as shown in FIG. 9B and, for example, downloaded from a content provider to the portable phone, and can be printed on an instant film 1 to make a photograph 5 as shown in FIG. 9C.

Generally, the characters 2 and 3 are copyrighted works. If the respective characters are works with copyrights of different companies, to make a photograph such as the photograph 5 may be unfavorable to the competitive companies. If there is a mechanism for preventing such a situation, any copyrighter will provide a service of distributing frame images including copyrighted characters to users. In the present circumstances, any copyrighter is passive in providing such a service because there is no mechanism for preventing the aforementioned situation. For this reason, the condition that a photograph such as the photograph 5 can be made is actually limited only when the characters 2 and 3 are not copyrighted. It is, however, a matter of course that users still desire to make photographs like the photograph 5 by using copyrighted characters.

SUMMARY OF THE INVENTION

In consideration of such circumstances, an object of the invention is to provide a print controller and a printer which can perform print control to avoid illegal printing against character copyrighters' wishes.

The invention provides a print controller comprising: a first identification information-acquiring unit for acquiring first identification information to identify a first character that is printed on a printing medium; a second identification information-acquiring unit for acquiring second identification information to identify a second character, wherein the second identification information is included in an image data of an image that is a subject of printing on the printing medium; a print permission judgment unit for making a judgment as to whether the image based on the image data is permitted to be printed on the printing medium, wherein the judgment is based on the first identification information, the second identification information and a print permission information that indicates whether the first character and the second character are permitted to be printed on a common printing medium; and an output unit for performing an output based on the judgment.

According to this configuration, it is possible to avoid printing against character copyrighters' wishes.

In the print controller according to the invention, the first identification information may be stored in a storage medium integrated with the printing medium.

Further, in the print controller according to the invention, the storage medium may include a wireless tag.

The invention provides a printer for printing an image based on image data received from a portable terminal apparatus, the printer including: the print controller; and a storage unit in which the print permission information is stored.

The invention provides a printer for printing an image based on image data received from a portable terminal apparatus, the printer including: the print controller; and a print permission information-acquiring unit for acquiring the print permission information stored in a storage medium integrated with the printing medium.

The invention provides a printer for printing an image based on image data received from a portable terminal apparatus, the printer including: the print controller; and a print permission information-receiving unit for receiving the print permission information from the portable terminal apparatus.

According to the invention, it is possible to provide a print controller and a printer that can perform print control to avoid printing against character copyrighters' wishes.

BRIEF DESCRIPTION OF THE DRAWINGS

FIG. 6 is a view showing a print permission table.

DETAILED DESCRIPTION OF THE INVENTION

Figure 1:
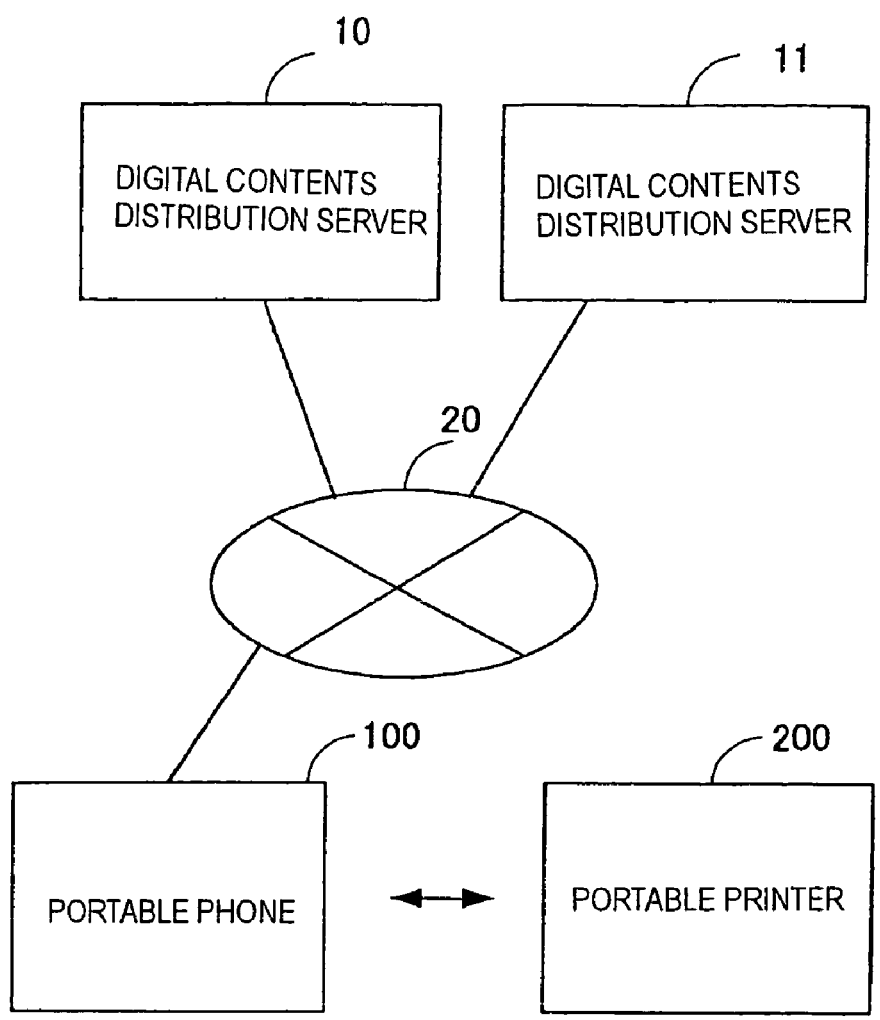
FIG. 1 is a block diagram showing the schematic configuration of a print system for explaining an exemplary, non-limiting embodiment of the invention.

FIG. 1 is a block diagram showing the schematic configuration of a print system for explaining an exemplary, non-limiting embodiment of the invention. The print system shown in FIG. 1 includes digital contents distribution servers 10 and 11 for distributing digital contents (i.e., image data) including characters to be copyrighted, the Internet 20, a portable phone 100 as an example of a portable terminal apparatus, such as a PDA or a portable phone connected to the Internet 20, and a portable printer 200 that may be coupled to the portable terminal apparatus.

The digital contents distributed from the digital contents distribution servers 10 and 11 are provided so that identification information (ID) for identifying each of characters contained in the digital contents is recorded, for example but not by way of limitation, in a header of each image data.

Figure 2:
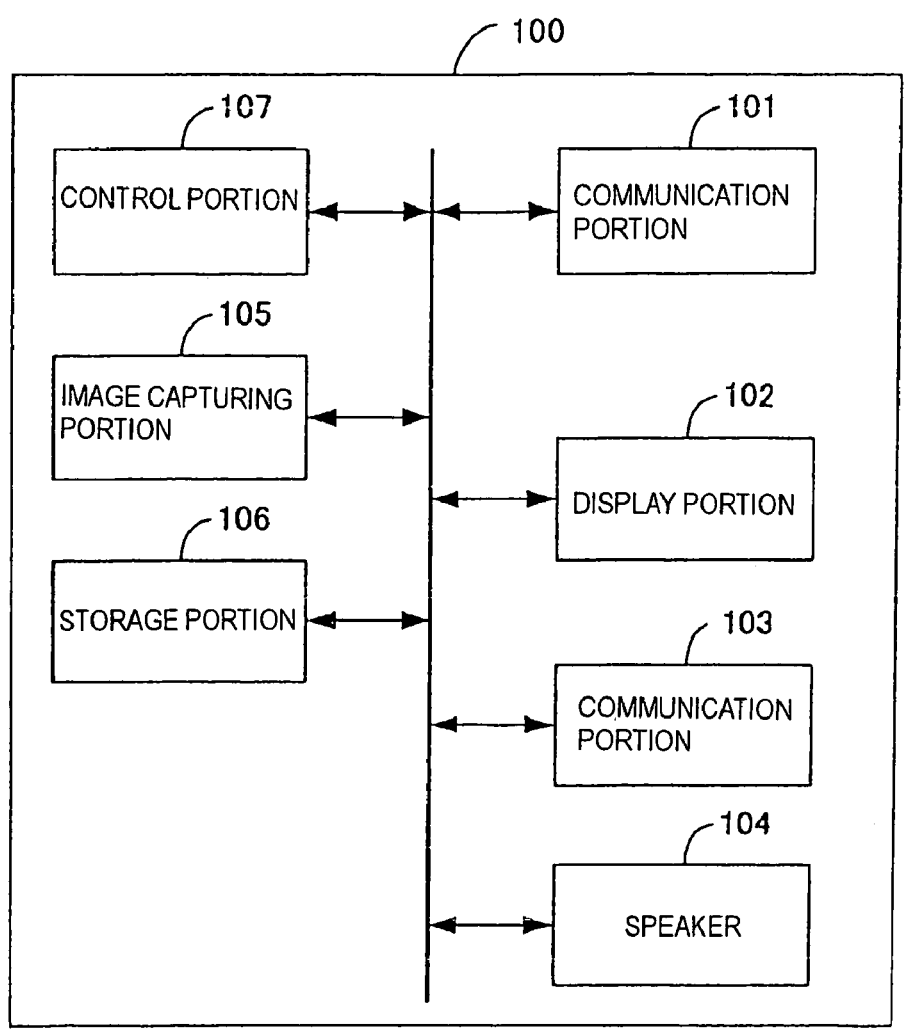
FIG. 2 is a block diagram showing the internal configuration of a portable phone in the print system for explaining an exemplary, non-limiting embodiment of the invention.

FIG. 2 is a block diagram of main part for explaining the internal configuration of the portable phone 100. The portable phone 100 includes a communication portion 101 connected to the Internet 20 for transmitting/receiving data through the Internet 20, a display portion 102 such as an LCD for displaying various kinds of information, a communication portion 103 for communicating with the portable printer 200, a speaker 104 for outputting voice, an image capturing portion 105 for capturing an image of a subject by an image capturing device such as a CMOS image sensor and generating data of the captured image, a storage portion 106 such as a flash memory or an EEPROM, and a control portion 107 for generally controlling the respective portions.

The communication portion 103 communicates with the portable printer 200 by means of short-range wireless communication such as infrared communication. Incidentally, the communication portion 103 may be connected to the portable printer 200 through a communication cable or may be directly connected to the portable printer 200 by connectors provided in the communication portion 103 and the portable printer 200, respectively.

Figure 3:
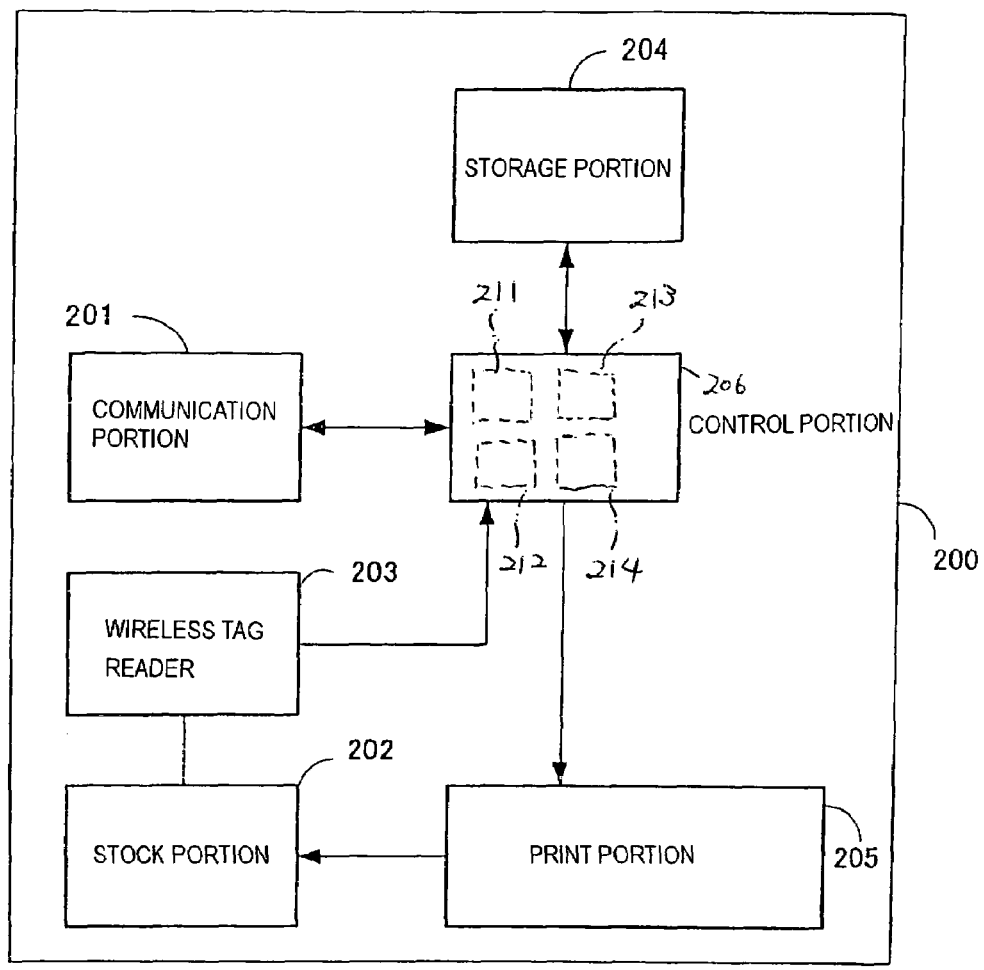
FIG. 3 is a block diagram showing the internal configuration of a portable printer in the print system for explaining an exemplary, non-limiting embodiment of the invention.

FIG. 3 is a block diagram of main part for explaining the internal configuration of the portable printer 200. The portable printer 200 includes a communication portion 201 for communicating with the portable phone 100, a stock portion 202 for stocking instant films 30 as one of printing media, a wireless tag reader 203, a storage portion 204, a print portion 205 and a control portion 206.

Figure 9A:
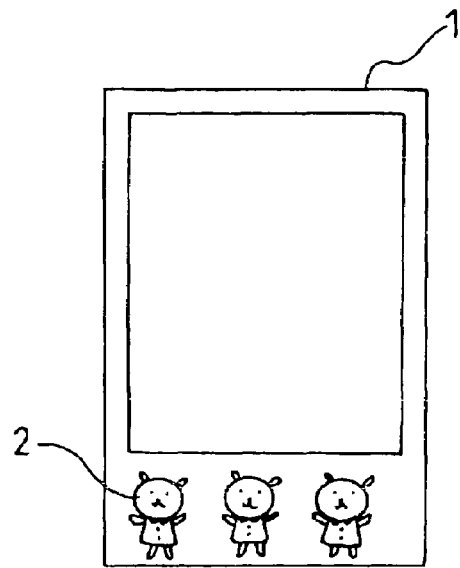
FIG. 9A is a view showing an example of the instant film.
Figure 9B:
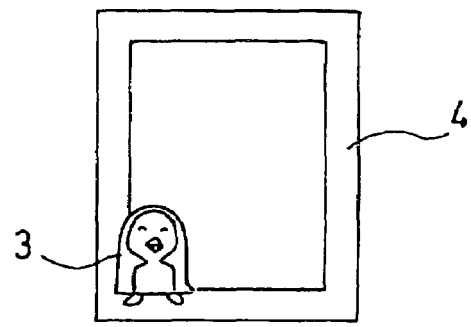
FIG. 9B is a view showing an example of a frame.
Figure 9C:
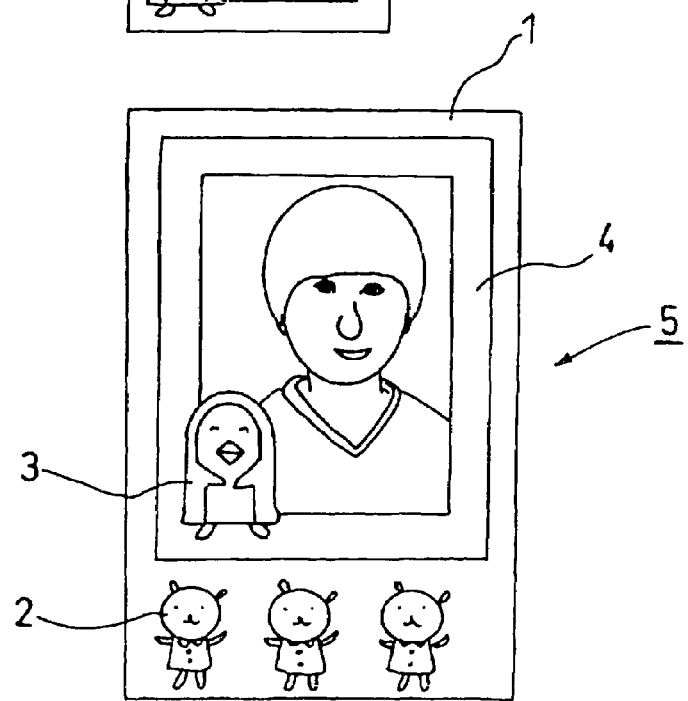
FIG. 9C is a view showing a synthesized photograph.

In this exemplary, non-limiting embodiment, an instant film having the same design as that of the instant film 1 shown in FIGS. 9A to 9C is used as each of the instant films 30.

Figure 4:
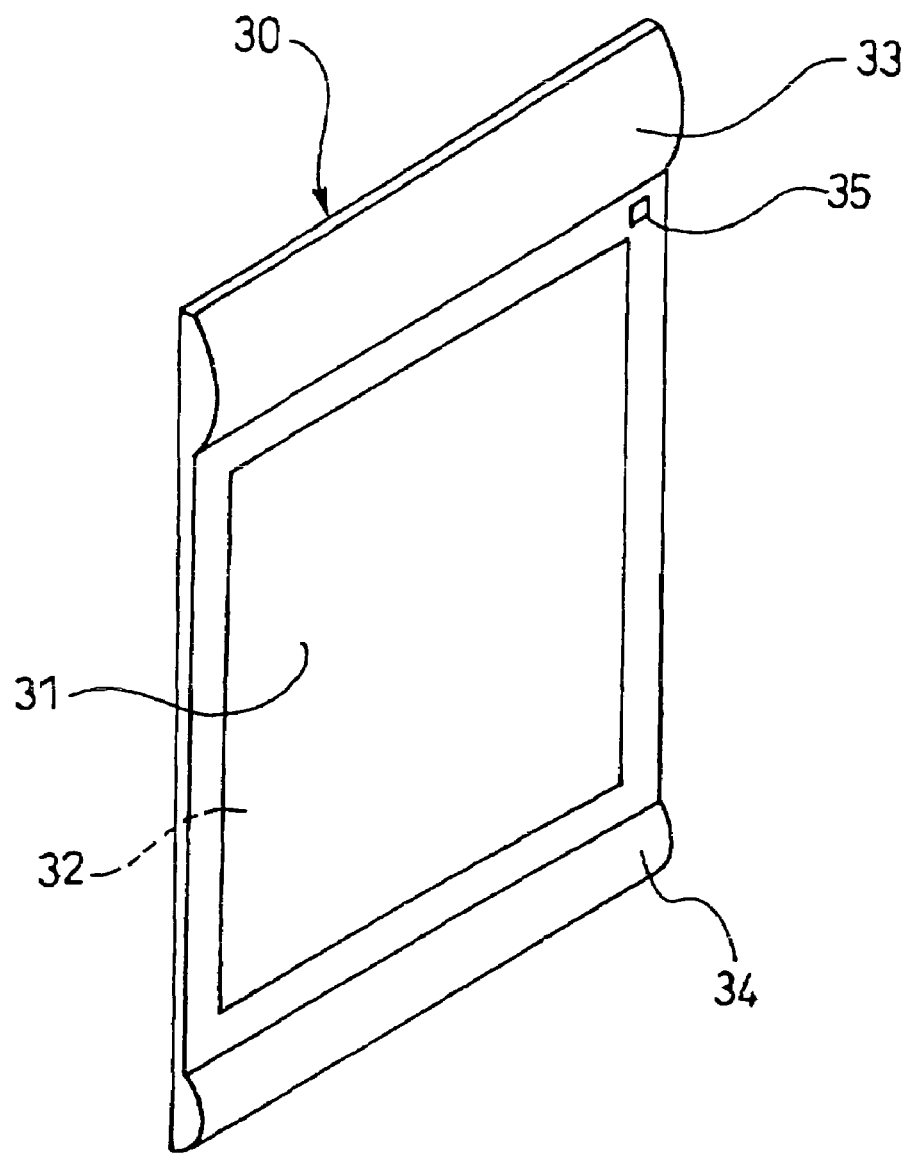
FIG. 4 is a view showing the schematic configuration of an instant film.

FIG. 4 is a view showing the schematic configuration of the instant film 30. The instant film 30 has a photosensitive sheet 31, an image receiving sheet 32 disposed on the back of the photosensitive sheet 31, a developer pod 33 disposed above the photosensitive sheet 31 and the image receiving sheet 32 and containing a developing solution enclosed therein, a trap portion 34 disposed below the photosensitive sheet 31 and the image receiving sheet 32 for trapping a surplus of the developing solution, and a wireless tag 35 serving as a storage medium for storing information. The wireless tag 35 is embedded under the developer pod 33, and where the photosensitive sheet 31 and the image-receiving sheet 32 are not provided. In this manner, the instant film 30 and the wireless tag 35 are integrated with each other.

Identification information (ID) for identifying a character printed in advance on the instant film 30 is stored in a built-in IC chip of the wireless tag 35.

As shown in FIG. 3, the communication portion 201 communicates with the portable phone 100 by means of short-range wireless communication such as infrared communication (but not limited thereto). Incidentally, the communication portion 201 may be connected to the portable phone 100 through a communication cable, or may be directly connected to the portable phone 100 by connectors provided in the communication portion 201 and the portable phone 100 respectively. Data received by the communication portion 103 is input into the control portion 206.

The wireless tag reader 203 reads the ID written into the IC chip of the wireless tag 35 integrated with the instant film 30 and inputs the ID into the control portion 206.

Figure 5:
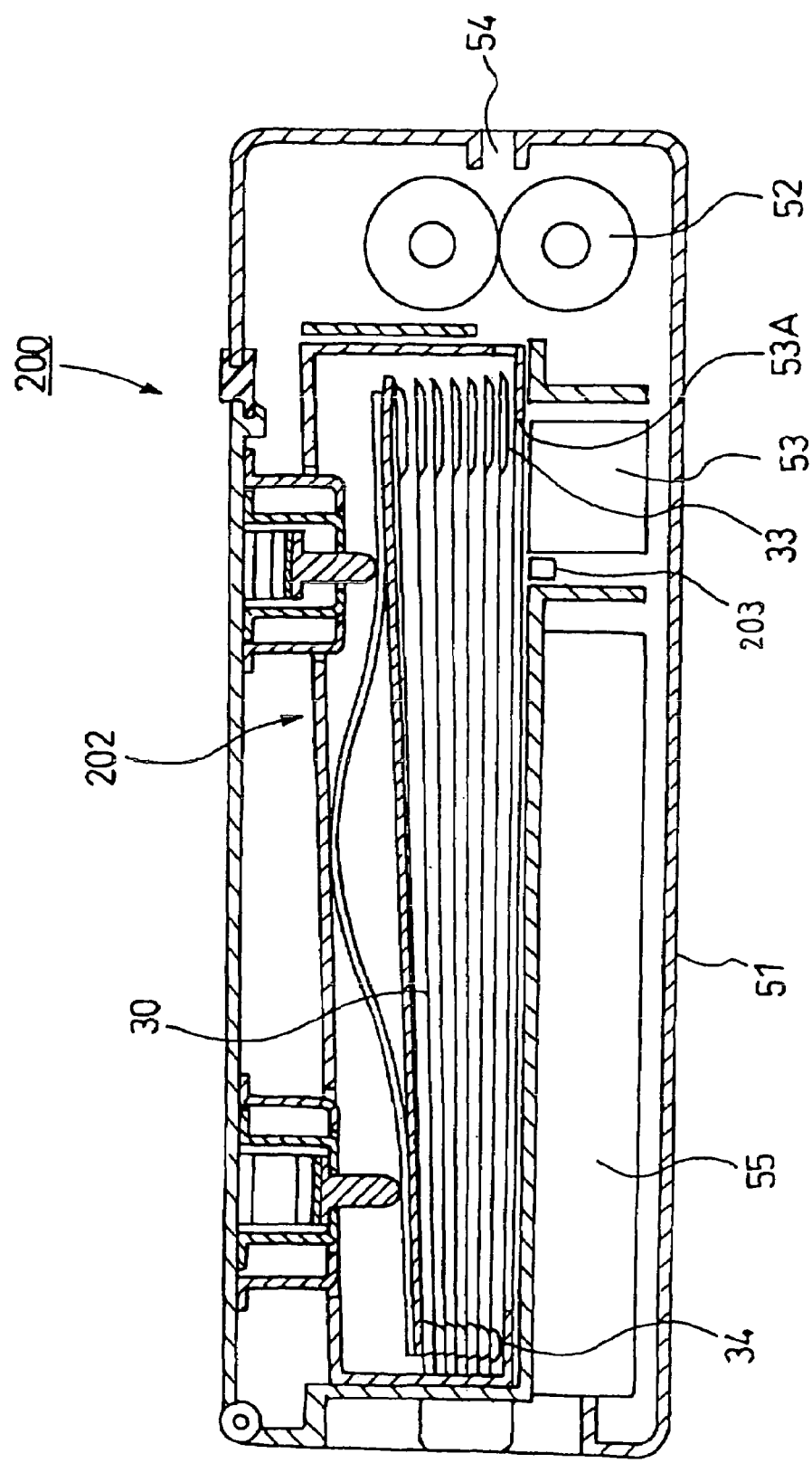
FIG. 5 is a view showing the structure of the portable printer in the print system for explaining the exemplary, non-limiting embodiment of the invention.

FIG. 5 is a view showing the structure of the portable printer 200. Constituent parts substantially the same as those in FIGS. 3 and 4 are referred to by the same numerals as those in FIGS. 3 and 4. A pair of spreading rollers 52, a multiple beam emission head 53, a stock portion 202, an ejection port 54 for ejecting each instant film 30, and a battery storage and circuit substrate 55 are provided in an outer casing 51 of the portable printer 200. The instant films 30 are provided so that the lowest one of the instant films 30 in FIG. 5 is fed in from the stock portion 202 by a claw mechanism (not shown) and then ejected from the ejection port 54 while the developing solution is spread onto the instant film 30 by the pair of spreading rollers 52.

On the other hand, the multiple beam emission head 53 is fixedly disposed under an exposure aperture 53A of the stock portion 202 so that the lengthwise direction of the multiple beam emission head 53 substantially perpendicularly crosses the carrying direction of the instant film 30. The multiple beam emission head 53 emits light beams based on the image data synchronously with the operation of carrying the instant film 30 to thereby form a latent image on the instant film 30.

The wireless tag reader 203 may be preferably located near the wireless tag 35 embedded in the instant film 30 in the condition that the instant film 30 is stocked in the stock portion 202. For example, the wireless tag reader 203 is provided near the multiple beam emission head 53. See JP-A-2002-92350, in which the detailed structure of the portable printer 200 is described in detail.

As shown in FIG. 3, the storage portion 204 stores a print permission table as one of print permission information indicating whether a character (hereinafter referred to as "first character") printed in advance on the instant film 30 (i.e., a print medium) and a character (hereinafter referred to as "second character") contained in digital contents distributed from the digital contents distribution servers 10 and 11 are permitted to be printed on one and the same instant film 30. The print permission table is generated based on, for example but not by way of limitation, the reflection of wishes of copyrighters.

FIG. 6 is a view showing the print permission table. The print permission table is generated on the assumption that the copyrighter of a character B is identical with the copyrighter of a character C, and that the copyrighter of the characters B and C competes with the copyrighter of a character A. In addition, the print permission table is generated on the assumption that the character A is set as a character allowed to exist as plural characters, whereas each of the characters B and C is set as a character allowed to exist as sole characters.

As shown in FIG. 6, when the first and second characters are both "character A", a mark "O" indicating that both the first and second characters are allowed to be printed on one and the same instant film 30 is set in a code a on the print permission table. In this case, printing is approved even in the case where the first and second characters are both "character A" because the copyrighters of the two characters to be printed are identical with each other, and the character A is not set as one of the characters allowed to exist as only a sole character.

When the first character is "character A" whereas the second character is "character B", a mark "X" indicating that the first and second characters are not allowed to be printed on one and the same instant film 30 is set in a code b on the print permission table. In this case, printing is unapproved because the copyrighter of the character A competes with the copyrighter of the character B. The same rule applies to codes c, d and g on the print permission table.

When the first and second characters are both "character B", a mark "X" indicating that both the first and second characters are not allowed to be printed on one and the same instant film 30 is set in a code e on the print permission table. In this case, printing may be expected to be approved because the copyrighters of the two characters to be printed are identical with each other. However, when the first and second characters are both "character B", printing is unapproved because the "character B" is set as the character allowed to exist only as a sole character. The same rule applies to a code I on the print permission table.

When the first character is "character B" whereas the second character is "characters C", a mark "O" indicating that both the first and second characters are allowed to be printed on one and the same instant film 30 is set in a code f on the print permission table. In this case, printing is approved because the copyrighters of the characters B and C are identical with each other. The same rule applies to a code h on the print permission table.

As shown in FIG. 3, the print portion 205 is provided for printing an image on the instant film 30 on the basis of image data input from the control portion 206. Printing by the print portion 205 is controlled by the control portion 206.

The control portion 206 is an embodiment of the print controller of the invention, which includes a first identification information-acquiring portion 211, a second identification information-acquiring portion 212, a print permission judgment portion 213, and an output portion 214. The first identification information-acquiring portion 211 performs a function of acquiring the ID of the first character. The second identification information-acquiring portion 212 performs a function of acquiring the ID of the second character. The print permission judgment portion 213 performs a function of making a judgment based on the IDs of the first and second characters and the print permission information as to whether the image based on the image data as a subject of print is permitted to be printed. The output portion 214 performs a function of generating an output based on the judgment.

More specifically, the first identification information-acquiring portion 211 acquires the ID of the first character from the wireless tag reader 203, and the second identification-acquiring portion 212 acquires the ID of the second character from a header of the image data of the image as a subject of print, the image data being received through the communication portion 201. Then, the print permission judgment portion 213 makes a judgment based on the IDs of the first and second characters and the print permission table stored in the storage portion 204 as to whether the image based on the image data as a subject of print is permitted to be printed. Based on a result of the judgment, the output portion 214 issues a print instruction to the print portion 205 or sends information for notification of unapproved printing to the portable phone 100 through the communication portion 201.

For example, but not by way of limitation, the control portion 206 including the first identification information-acquiring portion 211, the second identification information-acquiring portion 212, the print permission judgment portion 213, and the output portion 214, which perform the foregoing functions, can be a general purpose computer containing instructions for performing the below-described operation of the portable printer 200. As such, the control portion 206 may also include a computer-readable medium or a data carrier that contains instructions for performing the foregoing functions.

The operation of the portable printer 200 will be described below. The operation will be described below on the case where a user of the portable phone 100 downloads a frame (digital contents) as shown in FIG. 9B from the digital contents distribution server 10, generates original image data synthesized from the frame and person's image data captured by the image capturing portion 105 of the portable phone 100 and sends the original image data to the portable printer 200 to print an image based on the original image data. Since the original image data is an image synthesized from the captured image data and the frame, the ID of the second character is still recorded in the header of the image data.

Figure 7:
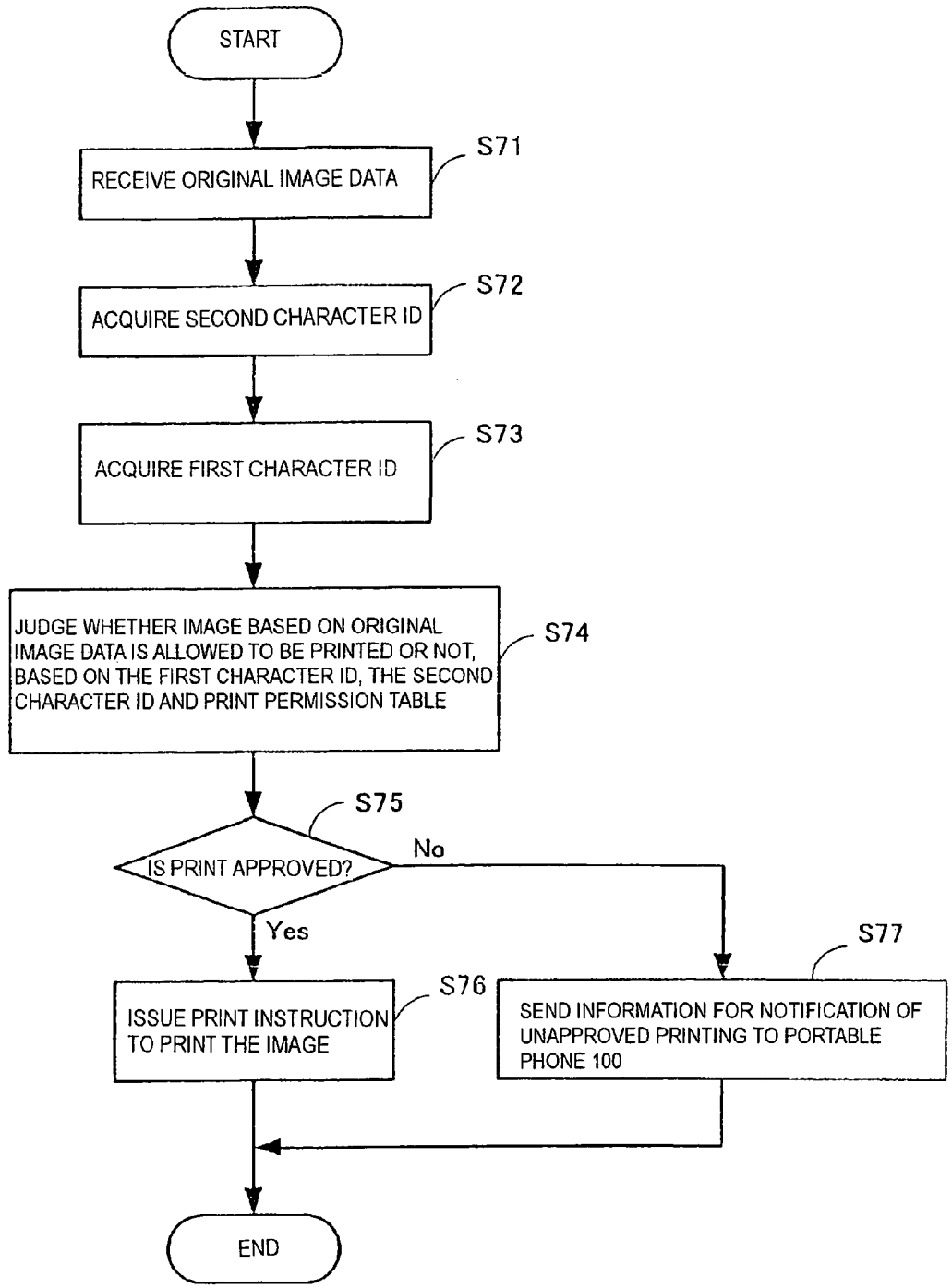
FIG. 7 is a flow chart of the operation of the portable printer for explaining the exemplary, non-limiting embodiment of the invention.

FIG. 7 is a flow chart showing the operation of the portable printer for explaining an embodiment of the invention. The control portion 206 of the portable printer 200 receives original image data through the communication portion 201 (S71). When a print instruction is issued by the user, the second identification information-acquiring portion 212 in the control portion 206 reads the ID of the second character from the header of the received original image data and acquires the ID of the second character (S72). Next, the control portion 206 operates the wireless tag reader 203, and the first identification information-acquiring portion 211 in the control portion reads the ID of the first character from the wireless tag 35 of the instant film 30 used for printing and acquires the read ID of the first character (S73).

The print permission judgment portion 213 in the control portion 206 makes a judgment based on the IDs of the first and second characters and the print permission table stored in the storage portion 204 as to whether the image based on the original image data received in S71 is permitted to be printed (S74).

When, for example but not by way of limitation, the acquired ID of the first character is "character B" whereas the acquired ID of the second character is "character C", The print permission judgment portion 213 in the control portion 206 makes a decision that printing is approved, because both the characters B and C are allowed to be printed on one and the same instant film 30. When, for example but not by way of limitation, the acquired ID of the first character is "character A" whereas the acquired ID of the second character is "character B", The print permission judgment portion 213 in the control portion 206 makes a decision that printing is unapproved because the characters A and B are not allowed to be printed on one and the same instant film 30.

When the judgment results in approved printing (YES in S75), the output portion 214 in the control portion 206 performs control to input the original image data into the print portion 205 and issue a print instruction to the print portion 205 to print the image based on the original image data on the instant film 30 (S76). In this manner, the image based on the original image data is printed on the instant film 30. After printing, the instant film 30 is ejected from the ejection port 54.

When the judgment results in unapproved printing (NO in S75), the control portion 206 generates notification information for notification of the fact that the image based on the original image data is disabled from being printed on the instant film 30 in accordance with the print instruction, and the output portion 214 in the control portion 206 sends the notification information to the portable phone 100 through the communication portion 201 (S77). As a result, a message "Image requested to be printed now is unapproved" (or the like) is displayed on the display portion 102 of the portable phone 100. Incidentally, this notification may be made by the portable printer 200 side, or may be output as a voice.

In the portable printer 200, when an image including a character to be copyrighted is to be printed on an install film 30 on which another character to be copyrighted has been printed in advance, the print permission table generated based on reflection of character copyrighters' wishes can be used for judging whether printing of the image is approved. Accordingly, when printing is requested by the user and against the character copyrighters' wishes, the printing can be avoided. Accordingly, the character copyrighters can more aggressively provide the service of distributing frame images using their characters, so that a useful service for the copyrighters and the users can be achieved.

Although the exemplary, non-limiting embodiment has been described for when the print permission table for judging permission of printing is stored in the storage portion 204 of the portable printer 200 in advance, the print permission table may be stored together with the ID of the first character, for example but not by way of limitation, in the wireless tag 35 of the instant film 30. In this case, the control portion 206 may acquire the print permission table together with the ID of the first character from the wireless tag 35 in S73 in FIG. 7.

Alternatively, the print permission table may be stored in the storage portion 106 of the portable phone 100. In this case, the print permission table may be sent together when the original image data is sent from the portable phone 100 to the portable printer 200 so that the control portion 206 can receive the print permission table through the communication portion 201. When the print permission table is downloaded through the Internet 20, the print permission table can support any new character immediately when the new character becomes available.

Although the embodiment has been described for when the judgment as to whether printing is approved is made in the portable printer 200, the judgment may be made alternatively in the portable phone 100. In this embodiment, the control portion 107 of the portable phone 100 can be the print controller of the invention.

Figure 8:
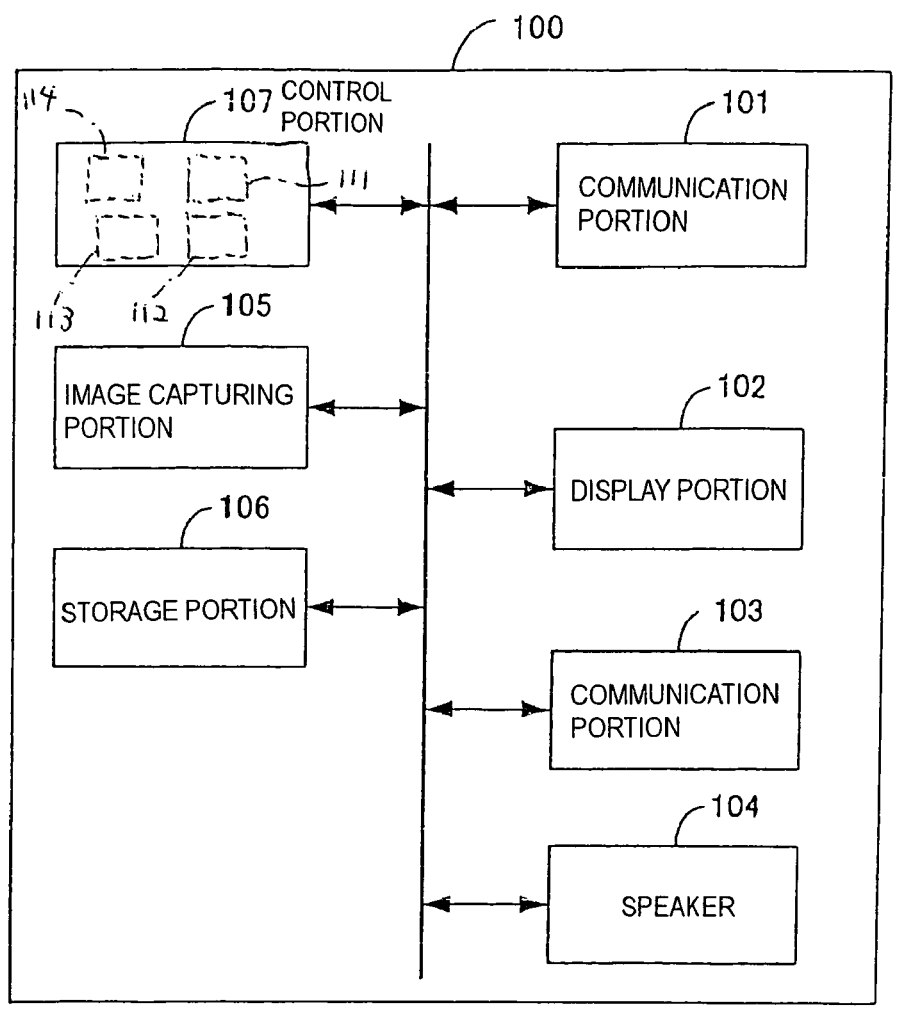
FIG. 8 is a block diagram showing the internal configuration of a portable phone in the print system for explaining an exemplary, non-limiting embodiment of the invention.

FIG. 8 is a block diagram of main part for explaining the internal configuration of this non-exemplary, limiting embodiment of the portable phone 100. Constituent parts the same as those in FIG. 2 are referred to by numerals the same as those in FIG. 2.

As shown in FIG. 8, the control portion 107 of the portable phone 100 includes a first identification information-acquiring portion 111, a second identification information-acquiring portion 112, a print permission judgment portion 113, and an output portion 114. The first identification information-acquiring portion 111 performs a function of acquiring the ID of the first character. The second identification information-acquiring portion 112 performs a function of acquiring the ID of the second character. The print permission judgment portion 113 performs a function of make a judgment based on the IDs of the first and second characters and the print permission information as to whether the image based on the image data as a subject of print is permitted to be printed. The output portion 114 performs a function of generating an output based on the judgment. The print permission table is stored in the storage portion 106.

More specifically, the control portion 107 of the portable phone 100 sends a request to the portable printer 200 to acquire the ID of the first character. In response to the request, the control portion 206 of the portable printer 200 sends the ID of the first character to the portable phone 100 through the communication portion 201. After the first identification information-acquiring portion 111 receives the ID of the first character, the second identification information-acquiring 112 acquires the ID of the second character from the header of the original image data as a subject of print, and the print permission judgment portion 113 makes a judgment based on the print permission table which is stored in the storage portion 106 and which indicates whether printing is approved. When printing is unapproved, the output portion 114 issues an instruction to the display portion 102, and a message is displayed on the display portion 102. When printing is approved, the output portion 114 issues another instruction to the communication portion 103, and the original image data may be sent from the communication portion 103 to the portable printer 200 and printed.

For example, but not by way of limitation, the control portion 107 including the first identification information-acquiring portion 111, the second identification information-acquiring portion 112, the print permission judgment portion 213, and the output portion 114, which perform the foregoing functions, can be a general purpose computer containing instructions for performing the foregoing functions. As such, the control portion 107 may also include a computer-readable medium or a data carrier that contains instructions for performing the foregoing functions.

Although the embodiment has been described on the case where the ID of the first character is stored in the wireless tag 35, another method than the wireless tag method may be used. For example, there may be used a method of embedding the ID in a character image printed on the instant film 30 by an electronic watermarking technique or a method of imprinting a code such as a barcode or a two-dimensional cod corresponding to the ID in the instant film 30. The method of storing the ID of the first character in the wireless tag is effective in preventing falsification of data, etc.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A print controller comprising:
   a first identification information-acquiring unit that acquires first identification information to identify a first character printed on a printing medium;
   a second identification information-acquiring unit that acquires second identification information to identify a second character, wherein the second identification information comprises data of an image that is a requested print subject on the printing medium;
   a print permission judgment unit that makes a judgment whether the image is permitted to be printed on the printing medium, wherein the judgment is based on the first identification information, the second identification information and a print permission information that indicates whether the first character and the second character are permitted to be printed on the printing medium; and
   an output unit that performs an output based on the judgment.

2. The print controller according to claim 1, wherein the first identification information is stored in a storage medium integrated with the printing medium.

3. The print controller according to claim 2, wherein the storage medium comprises a wireless tag.

4. A printer for printing an image based on an image data received from a portable terminal apparatus, the printer comprising:
a print controller comprising:
a first identification information-acquiring unit that acquires first identification information to identify a first character printed on a printing medium;
a second identification information-acquiring unit that acquires second identification information to identify a second character, wherein the second identification information is included in the image data of the image that is a requested print subject on the printing medium;
a print permission judgment unit that makes a judgment whether the image based on the image data is permitted to be printed on the printing medium, wherein the judgment is based on the first identification information, the second identification information and a print permission information that indicates whether the first character and the second character are permitted to be printed on the printing medium; and
an output unit that performs an output based on the judgment; and
a storage unit in which the print permission information is stored.

5. The printer according to claim 4, wherein the first identification information is stored in a storage medium integrated with the printing medium.

6. The printer according to claim 5, wherein the storage medium comprises a wireless tag.

7. A printer for printing an image based on an image data received from a portable terminal apparatus, the printer comprising:
a print controller comprising:
a first identification information-acquiring unit that acquires first identification information to identify a first character printed on a printing medium;
a second identification information-acquiring unit that acquires second identification information to identify a second character, wherein the second identification information is included in the image data of the image that is a requested print subject on the printing medium;
a print permission judgment unit that makes a judgment whether the image is permitted to be printed on the printing medium, wherein the judgment is based on the first identification information, the second identification information and a print permission information that indicates whether the first character and the second character are permitted to be printed on the printing medium; and
an output unit that performs an output based on the judgment; and
a print permission information-acquiring unit that acquires the print permission information, wherein the print permission information is stored in a storage medium integrated with the printing medium.

8. The printer according to claim 7, wherein the first identification information is stored in a storage medium integrated with the printing medium.

9. The printer according to claim 8, wherein the storage medium comprises a wireless tag.

10. A printer for printing an image based on an image data received from a portable terminal apparatus, the printer comprising:
a print controller comprising:
a first identification information-acquiring unit that acquires first identification information to identify a first character printed on a printing medium;
a second identification information-acquiring unit that acquires second identification information to identify a second character, wherein the second identification information is included in the image data of the image that is a requested print subject on the printing medium;
a print permission judgment unit that makes a judgment whether the image is permitted to be printed on the printing medium, wherein the judgment is based on the first identification information, the second identification information and a print permission information that indicates whether the first character and the second character are permitted to be printed on a common printing medium; and
an output unit that performs an output based on the judgment; and
a print permission information-receiving unit that receives the print permission information from the portable terminal apparatus.

11. The printer according to claim 10, wherein the first identification information is stored in a storage medium integrated with the printing medium.

12. The printer according to claim 11, wherein the storage medium comprises a wireless tag.

13. A print controller comprising:
means for acquiring first identification information to identify a first character that is printed on a printing medium;
means for acquiring second identification information to identify a second character, wherein the second identification information comprises data of an image that is a requested print subject on the printing medium;
means for making a judgment whether the image is permitted to be printed on the printing medium, wherein the judgment is based on the first identification information, the second identification information and a print permission information that indicates whether the first character and the second character are permitted to be printed on the printing medium; and
means for performing an output based on the judgment.

14. A method for controlling a printer, comprising:
acquiring first identification information to identify a first character that is printed on a printing medium;
acquiring second identification information to identify a second character, wherein the second identification information comprises data of an image that is a requested print subject on the printing medium;
making a judgment whether the image is permitted to be printed on the printing medium, wherein the judgment is based on the first identification information, the second identification information and a print permission information that indicates whether the first character and the second character are permitted to be printed together on the printing medium; and
performing an output based on the judgment.

* * * * *